United States Patent
Floan et al.

(10) Patent No.: US 10,441,905 B2
(45) Date of Patent: Oct. 15, 2019

(54) EXTRACTOR WITH SCREEN WASHING SYSTEM

(71) Applicant: Crown Iron Works Company, Roseville, MN (US)

(72) Inventors: Benjamin Wayne Floan, Andover, MN (US); George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 0 days.

(21) Appl. No.: 14/717,789

(22) Filed: May 20, 2015

(65) Prior Publication Data
US 2015/0336035 A1 Nov. 26, 2015

Related U.S. Application Data

(60) Provisional application No. 62/000,691, filed on May 20, 2014.

(51) Int. Cl.
| | | |
|---|---|---|
| *B01D 33/01* | (2006.01) | |
| *B01D 33/72* | (2006.01) | |
| *B01D 33/50* | (2006.01) | |
| *B08B 3/02* | (2006.01) | |
| *B07B 1/55* | (2006.01) | |
| *B05B 1/20* | (2006.01) | |

(Continued)

(52) U.S. Cl.
CPC ......... *B01D 33/0158* (2013.01); *B01D 33/50* (2013.01); *B01D 33/72* (2013.01);
(Continued)

(58) Field of Classification Search
CPC ...... A61M 39/1055; B07B 1/55; B01D 33/48; B01D 11/023; B08B 3/024
See application file for complete search history.

(56) References Cited

U.S. PATENT DOCUMENTS 3,515,274 A * 6/1970 Wehner ..................... B07B 1/36
  209/322
4,261,831 A * 4/1981 Linsenmeyer ......... B01D 25/38
  134/172

(Continued)

FOREIGN PATENT DOCUMENTS

| CN | 201320529 Y | 10/2009 |
|---|---|---|
| CN | 203209311 U | 9/2013 |

(Continued)

OTHER PUBLICATIONS

International Patent Application No. PCT/US2015/031792, International Search Report and Written Opinion dated Aug. 26, 2015, 9 pages.

*Primary Examiner* — Ryan B Huang
(74) *Attorney, Agent, or Firm* — Fredrikson & Byron, P.A.

(57) ABSTRACT

An extractor can be used to extract solvent-soluble molecules, such as aqueous or organic-soluble molecules, from solid material feedstock for downstream processing and recovery. In one configuration, the extractor is a percolation extractor having one or more extraction chambers each containing a screen supporting the solid materials as it is conveyed through the chamber, a fluid supply system delivering extraction fluid disposed above the solid material, and a fluid recovery system disposed below the solid materials for receiving the extraction fluid and solvent-soluble molecules contained therein. The extractor further includes a screen washing system disposed under the screen and supported against movement. The screen washing system includes a washing fluid intake and a plurality of outlet nozzles directed upward towards the screen. The screen (Continued)

washing system can keep the screen from plugging during operation, improving the extraction efficiency of the extractor.

21 Claims, 9 Drawing Sheets

(51) Int. Cl.
    *B01D 11/02* (2006.01)
(52) U.S. Cl.
    CPC ............ *B05B 1/20* (2013.01); *B07B 1/55* (2013.01); *B08B 3/02* (2013.01)

(56) References Cited

U.S. PATENT DOCUMENTS

| | | | |
|---|---|---|---|
| 4,608,122 A * | 8/1986 | Klein | B01D 11/023 162/209 |
| 4,751,060 A | 6/1988 | Kratochwill | |
| 5,400,812 A * | 3/1995 | MacFarlane | B41F 35/004 134/152 |
| 5,591,416 A | 1/1997 | Kemper et al. | |
| 5,617,611 A * | 4/1997 | Worwag | A47L 5/32 15/323 |
| 5,770,082 A | 6/1998 | Anderson | |
| 2006/0281326 A1 * | 12/2006 | Ose | H01L 21/67051 438/745 |
| 2009/0250082 A1 * | 10/2009 | Miller | B08B 3/022 134/10 |
| 2012/0074074 A1 | 3/2012 | Lean et al. | |

FOREIGN PATENT DOCUMENTS

| | | | |
|---|---|---|---|
| CN | 203525361 U | 4/2014 | |
| EP | 0804953 A1 * | 11/1997 | ............ B01S 11/023 |
| WO | 2013159024 A1 | 10/2013 | |

* cited by examiner

EXTRACTOR WITH SCREEN WASHING SYSTEM

This application claims priority to U.S. Provisional Application No. 62/000,691 filed May 20, 2014, the entire contents of which are incorporated herein by reference.

TECHNICAL FIELD

This disclosure relates to solvent extraction and, more particularly, to liquid-solvent extractors.

BACKGROUND

A variety of different industries use extractors to extract and recover substances entrained within solids. For example, producers of products from renewable organic sources use extractors to extract carbohydrates and/or oil from solid matter, such as soybeans, rapeseed, sunflower seed, peanuts, cottonseed, palm kernels, and corn germ. The matter is contacted with a solvent within the extractor, causing the desired product to be extracted from a surrounding cellular structure into the solvent.

SUMMARY

In general, this disclosure is directed to devices, systems, and techniques for washing the screen of an extractor along which solid material is conveyed during extraction. The extractor can include one or more bed decks upon which incoming material is deposited and transported through the extractor. For example, the extractor may be configured as a percolation extractor in which solid material is conveyed along the bed decks through different stages in which extraction fluid, or solvent, is distributed down over the solid material. A fluid distribution system can be positioned over the bed deck in each stage of the extractor and a fluid collection system positioned underneath the bed deck in each stage. In operation, the solid material can be conveyed along the bed decks and the liquid extraction fluid distributed over the fluid using the fluid distribution system in each stage. The extraction fluid can filter, or percolate, down through the solid material on the bed deck, extracting components from the solid material soluble in the fluid being used as an extraction fluid. The extraction fluid having an increased concentration of soluble compounds drains through the bed deck and is collected by the fluid collection system.

To allow the extraction fluid to drain through the bed deck during operation of the extractor, the bed deck can be formed of a screen having apertures. The apertures can have a size large enough to be effective to allow the extraction fluid to drain through the screen but small enough to keep the solid material upon which the extraction process is being performed from falling through the apertures. The size of the apertures will typically vary based on the size of the material being processed.

In typical operation without a wash system, the apertures of the screen can become plugged with solid material being processed. This can occur as the solid material breaks down, reducing down to a size that can fit within the apertures and/or forming a viscous mass that can fill the apertures. Over time, the extraction efficiency of the extractor can degrade if enough apertures in the bed deck become plugged such that extraction fluid passing through the material being processed cannot readily drain through the bed deck. This can necessitate time consuming shutdown to manually clean the bed deck, typically using high pressure liquid water or steam.

In accordance with the present disclosure, an extractor is provided with a wash system configured to wash the bed deck during operation. In some examples, the wash system is positioned underneath the bed deck and contains a plurality of nozzles positioned to direct washing fluid against an underside of the bed deck. The washing system can spray pressurized washing fluid against the bed deck and through the apertures passing therethrough, helping to prevent the apertures from plugging and/or clearing the apertures once plugged.

Although the washing system can spray any desired washing fluid on the underside of the bed deck, in one example, the washing system sprays a washing fluid that is the same (e.g., same composition) as the extraction fluid used to extract the solid material being processed. For example, the extraction fluid and washing fluid may be drawn from a common (shared source) such that the extraction fluid is the same as the washing fluid. In operation, as the washing fluid is sprayed against the underside of the bed deck, the washing fluid can contact the underside of the bed deck and/or pass through the apertures in the bed deck, draining back down past the washing system and into the fluid collection system positioned underneath the bed deck. There, the residual washing fluid can combine with extraction fluid having passed through the bed deck and solid material contained thereon for removal (and, optionally, recycling) via the fluid collection system.

While the configuration of the washing system can vary depending on the configuration of the extractor, in some applications, the washing system is configured to move relative to the bed deck. For example, the washing system may be sized smaller than the width of the bed deck and configured to translate laterally such that washing fluid is delivered to the underside of the bed deck across its entire width as the washing system translates. In one example in accordance with this configuration, the washing system translates laterally (e.g., by sliding side-to-side). In another example in accordance with this configuration, the washing system is pivotably mounted under the bed deck and oscillates about pivot points (e.g., rocking laterally side-to-side) to cover substantially the entire underside of the bed deck with washing fluid spray. By configuring the washing system to be smaller than the width of the bed deck, the system can be made smaller than the bed deck and the amount of washing fluid utilized during washing reduced.

In one example, an extractor is described that includes an extraction chamber, a conveyance system to convey solid materials through the extraction chamber in a direction of material travel, and a screen supported by the screen frame and configured to receive solid materials as they are conveyed by the conveyance system. The extractor also includes a fluid supply system disposed above the solid materials and configured to apply a fluid to the solid materials and a fluid removal system disposed below the solid materials and configured for removing the fluid after it has passed through the solid materials and the screen. The extractor further includes a screen washing system disposed under the screen and supported against movement in the direction of material travel, the screen washing system including a washing fluid intake and a plurality of outlet nozzles directed upward towards the screen.

The details of one or more examples are set forth in the accompanying drawings and the description below. Other

DETAILED DESCRIPTION

In some embodiments, the invention includes an extractor with a washing system. Within the extractor, solid material supported by a screen can be conveyed through extraction chambers and exposed to a solvent therein to extract components of interest from the solid material. Some embodiments of the invention include a washing system configured to wash the screen to promote efficient drainage therethrough.

The extractor can be of any type. In one example, shown in FIG. 1, the extractor 10 includes a housing defining a passageway in the form of a loop disposed in a vertical plane. The extractor can include upper and lower extraction sections 20, 30 each with a series of extraction chambers, a generally arcuate hollow transfer section 40 having its opposite upper and lower ends connected to first ends of the upper and lower extraction sections respectively, and a hollow, generally vertical return section 50 connected at its upper and lower ends respectively to the other ends of the upper and lower extraction sections. The upper extraction section can include an inlet portion 60 for delivery of solid material to the interior thereof in closely spaced relation to the upper end of the return section, and the lower end of the return section can define an opening 70 for discharge of the material after the product-of-interest has been extracted therefrom. The number of extraction chambers, or stages, provided by the extractor can vary depending on the desired sized of the extractor. The extractor includes at least one extraction chamber, or stage, and typically includes multiple stages (e.g., 6 stages, 8 stages, or more). A Model III extractor commercially available from Crown Iron Works Company of Minneapolis, Minn., is a specific example of an extractor of this type.

Figure 1:
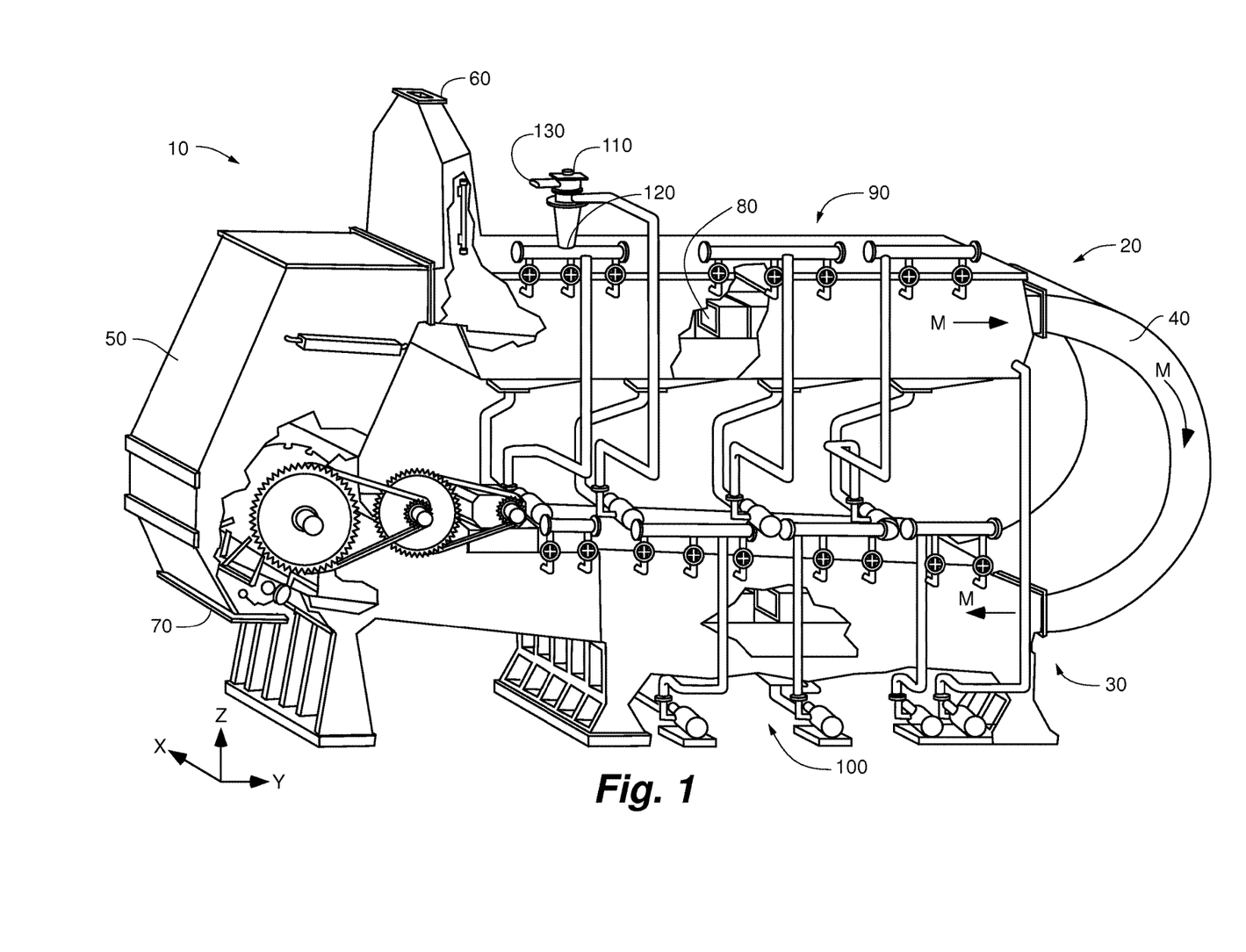
FIG. 1 is perspective view of a representative solvent extractor system with some parts being broken away.

In such an extractor, a conveyor system 80 can extend longitudinally through the looped passageway and be driven in a material flow direction "M" to move the material as a bed from the inlet portion 60 through the upper extraction section 20 toward and downwardly through the transfer section 40, and through the lower extraction section 30 toward the lower end of the return section and the discharge opening 70. In some embodiments, the conveyor system includes a pair of laterally spaced endless link chains and a plurality of longitudinally spaced flights that extend transversely of the chains. A motor and gearing may be provided to drive the conveyor.

In some embodiments, a fluid supply system 90 can be disposed above the solid materials and configured to apply a fluid to the solid materials in each extraction chamber, and a fluid removal system 100 can be disposed below the solid materials and configured for removing the fluid after it has passed through the solid materials in each extraction chamber. In some embodiments, the fluid supply system and the fluid removal system are in fluid communication via various recycle streams and the like. The fluid supply system may include a network of spray headers, pumps, and pipes to apply the fluid in each extraction chamber. The fluid supply system can apply (e.g., spray) the extraction fluid on top of the conveyed solid material, allowing the extraction fluid to then percolate through the material. The fluid removal system may include a network of drains, pumps, and pipes to collect the fluid after it has percolated through the solid material in each extraction chamber and deliver it to the fluid supply system of another extraction chamber or remove it from the system.

Extractor 10 can process any desired solid material using any suitable extraction fluid. Example types of solid material that can be processed using extractor 10 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds, carrots; chicken parts; chlorophyll; diatomic pellets; fish meal; hops; oats; pine needles; tar sands; vanilla; and wood chips and/or pulp. Fluids that can be used for extraction from solid material include, but are not limited to a hydrocarbon (e.g., acetone, hexane, toluene), alcohol (e.g., isopropyl alcohol, ethanol, other alcohols), and water.

In some embodiments, fluid having passed through the solid material is collected by the fluid removal system 100 and delivered to a cyclone-type separator 110 before it is removed from the extractor to separate any solid fines from the fluid before fluid discharge. The separator can have a lower discharge end 120 connected to an extraction chamber for re-delivery of separated solid materials in the extractor, generally in the first extraction chamber after the fresh solid material inlet 60. An outlet conduit 130 of the separator 110 delivers the fluid, generally a mixture of extraction fluid and soluble components extracted from the solid material into the extraction fluid (e.g., oil when processing oil seed)

(commonly known as "miscella"), to other equipment, not shown, for separating the extraction fluid from the material extracted from the solid material being processed.

As the material is conveyed through the extractor, spray headers from the fluid supply system 90 spray recycled extraction fluid on the top of the material. The material percolates through the material and through the screen, where it is collected in the network of drain pipes and delivered back to the network of spray headers where it is reapplied to the solid material in a different extraction chamber.

In the embodiment shown, a delivery conduit 130 connected to a source of liquid extraction fluid supply (not shown) is connected to the fluid supply system to supply fresh extraction fluid in at least one extraction chamber. In some embodiments, fresh extraction fluid is applied to the material in the last extraction chamber before the solid material discharge 70. For example, fresh extraction fluid may be applied to the material in the last extraction chamber before discharge 70 and, after being collected at the bottom of the chamber, recycled and applied on top of solid material in an adjacent upstream extraction chamber. By recycling collected extraction fluid from one extraction chamber to an adjacent upstream extraction chamber, liquid extraction fluid and solid material being processed can move in countercurrent directions through the extractor. For example, as extraction fluid is conveyed sequentially through adjacent extraction chambers between a fresh extraction fluid inlet adjacent discharge 70 and an enriched extraction fluid outlet adjacent inlet 60, the concentration of extract relative to extraction fluid increases from a relatively small extract-to-extraction fluid ratio to a comparatively large extract-to-extraction fluid ratio. Similarly, as the solid material is conveyed in the opposing direction, the concentration of extract in the solid feedstock decreases from a comparatively high concentration at the inlet 60 to a comparatively low concentration at the outlet 70.

Figure 2A:
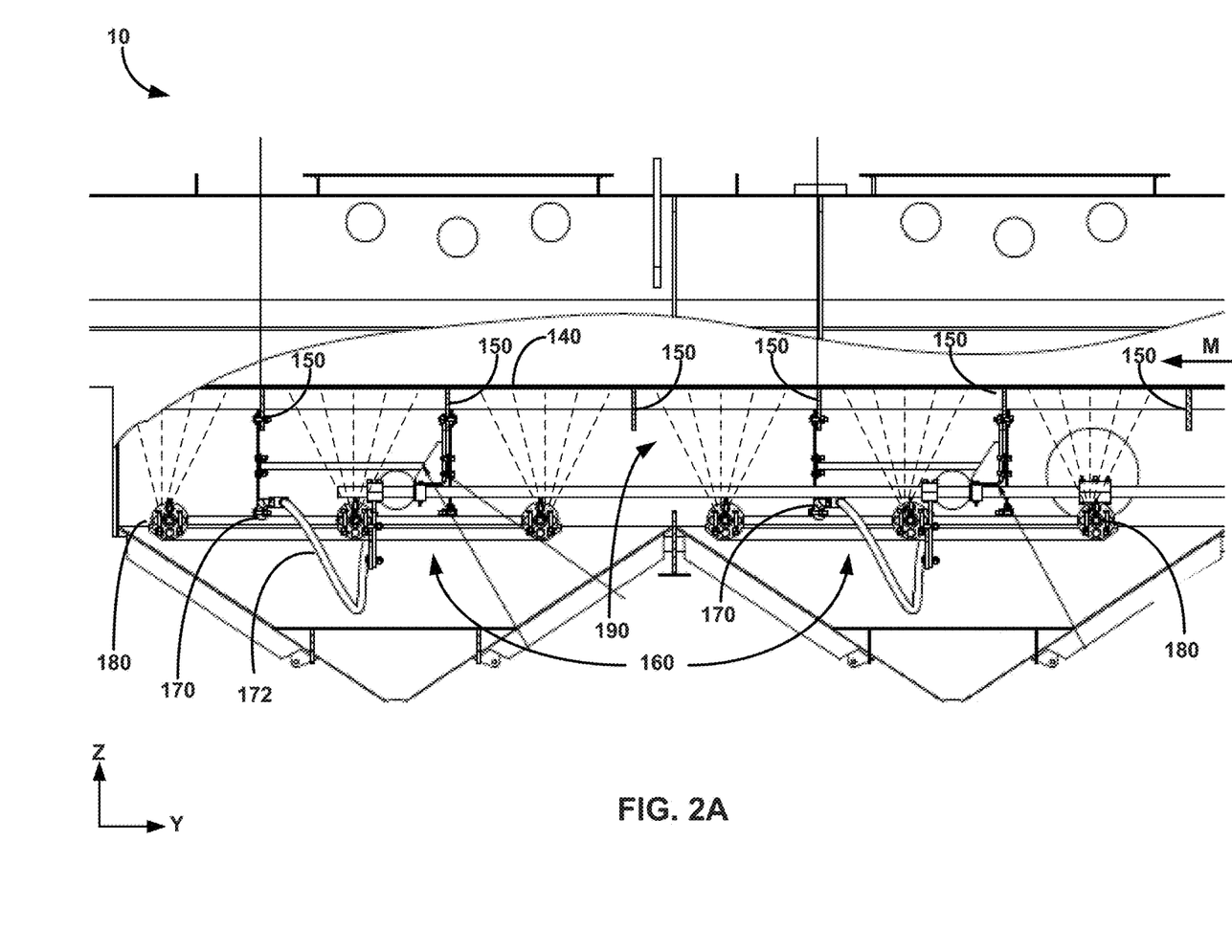
FIG. 2A is side-elevation view of a representative solvent extractor system with a washing system in accordance with an embodiment of the invention, some parts being broken away and some parts being shown in section.

FIG. 2A is a side-elevation view showing an example configuration extractor 10. The configuration of components illustrated in FIG. 2A is representative of how hardware components can be arranged in a portion of upper extraction section 20 and/or lower extraction section 30. While FIG. 2A only illustrates a portion of one extraction section, it should be appreciated that the other extraction section (e.g., upper extraction section 20 and/or lower extraction section 30) can have a similar configuration of components. For example, extraction sections can have screens, screen washing systems, and frames as discussed in greater detail below.

Figure 2B:
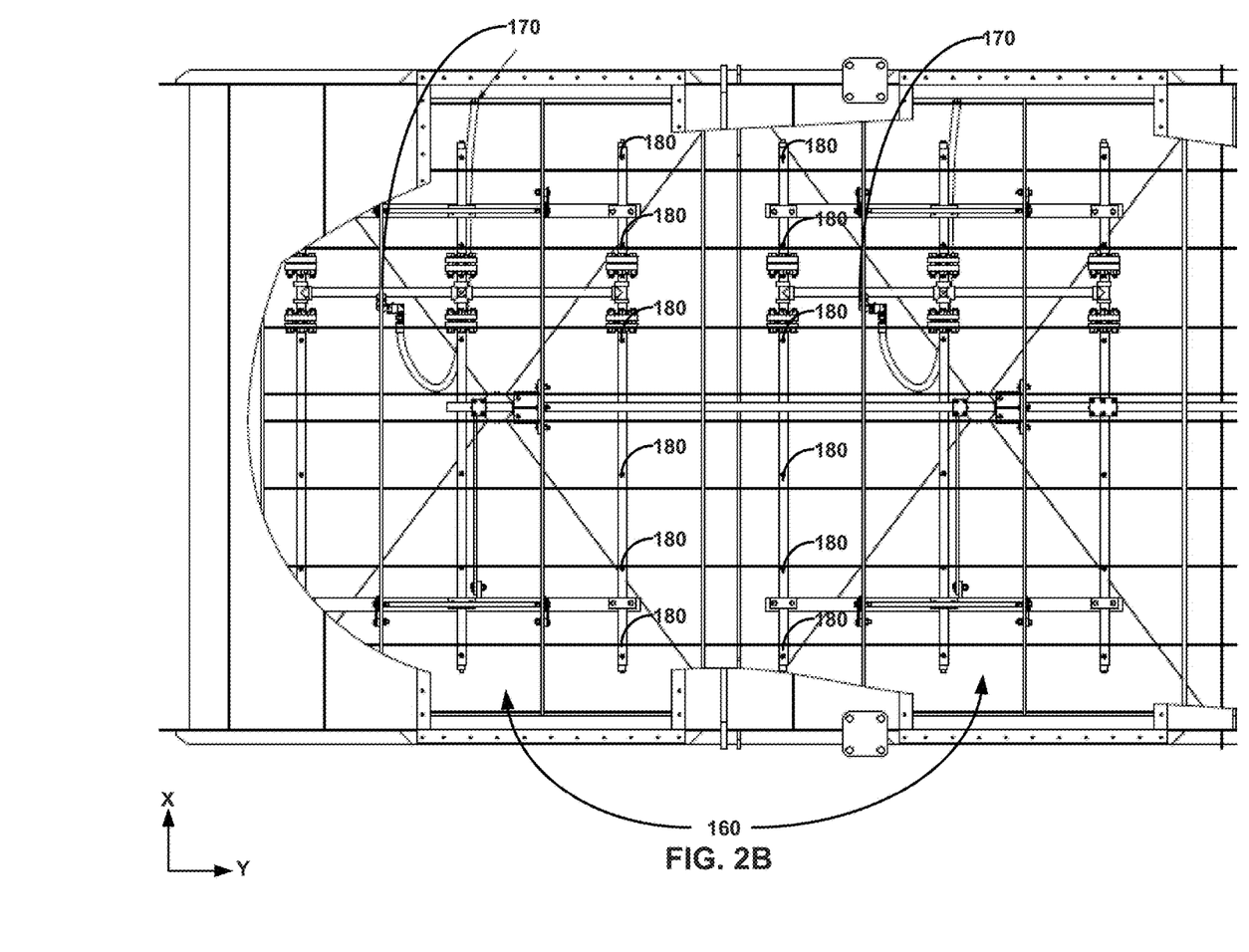
FIG. 2B is top-elevation view of a representative solvent extractor system with a washing system in accordance with an embodiment of the invention, some parts being broken away and some parts being shown in section.
Figure 2C:
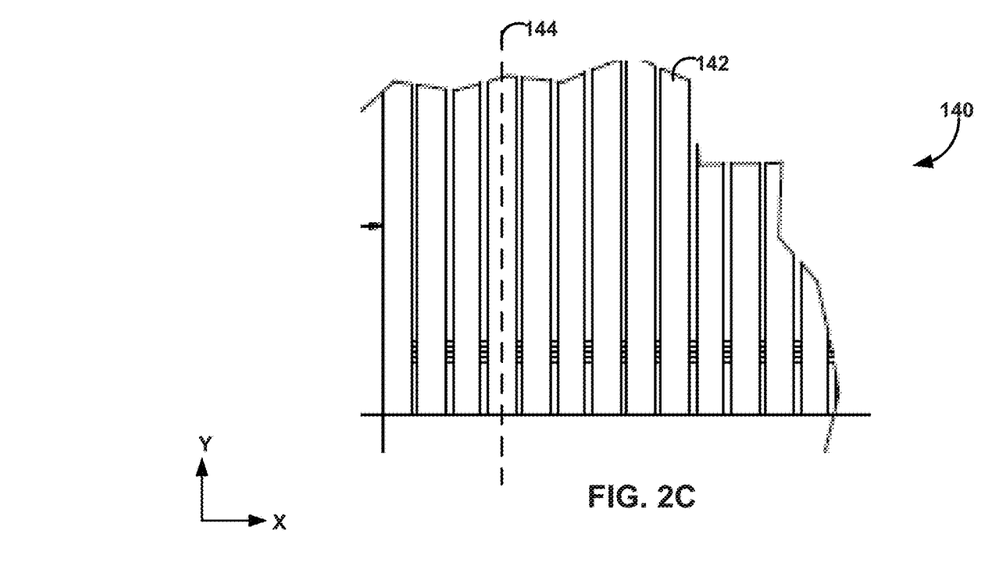
FIGS. 2C and 2D are top and side views, respectively, of an example screen that can be utilized on the example extractor system of FIG. 1.
Figure 2D:
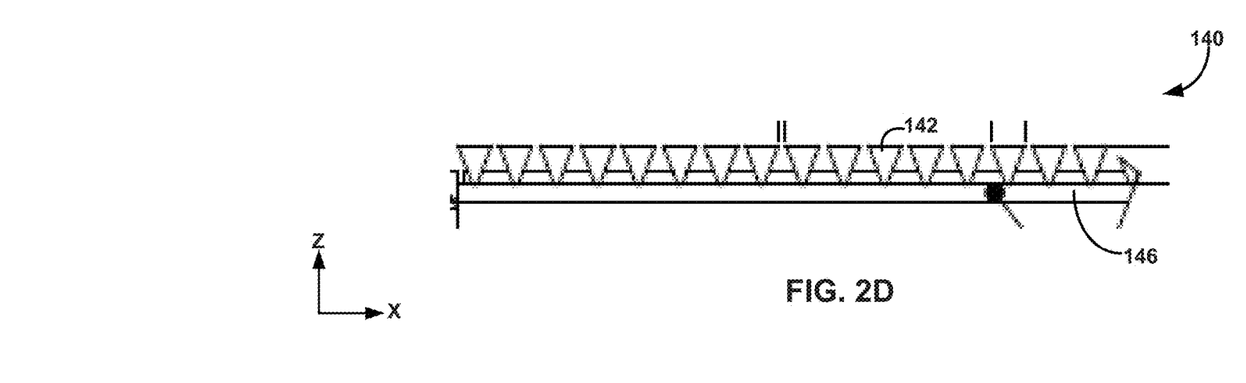

As shown in FIG. 2A, in some embodiments the conveyor system moves the material through the extractor across the top of a screen 140. The screen can support the material as it is conveyed and allow fluid to drain through it. In some embodiments, the screen includes a plurality of closely spaced parallel bars. In certain embodiments, the bars are oriented such that their longitudinal axes are generally parallel with a direction of material travel "M" (e.g., such that the bars extend in the Y-direction indicated on FIG. 1 and the material also travels in the Y-direction indicated on FIGS. 1 and 2). A gap between adjacent bars may be provided and sized to allow liquid drainage therethrough but resist solid material passing therethrough. In some embodiments, the bars have smooth top surfaces disposed in a common horizontal plane (e.g., the X-Y plane indicated on FIG. 1), and extend substantially the full length of their respective extraction chambers. For example, FIG. 2C illustrates an example screen 140 having bars 142. The bars have longitudinal axes 144 oriented generally parallel to the direction of material (e.g., in the Y-direction indicated on FIG. 2C). In some embodiments, the bars 142 are supported from underneath (e.g., in the Z-direction indicated on FIG. 1) with stiffeners. For example, as shown in FIG. 2D, stiffeners 146 are attached underneath bars 142 and provide mechanical support thereto. The stiffeners in FIG. 2D have a longitudinal axis aligned perpendicular with the direction of material travel (e.g., in the X-direction indicated on FIGS. 1 and 2D), although other orientations are possible.

With further reference to FIG. 2A, a screen frame 150 may be provided to support the screen within the extraction chambers. In some embodiments, the screen frame includes a series of support bars supported by the extractor superstructure. The support bars may span the width of the screen to support the underside of the screen and be oriented perpendicular to the direction of material travel (e.g., the Z-direction indicated on FIG. 2). In embodiments of screens including parallel bars, the support bars of screen frame 150 may be perpendicular to the parallel bars of the screen.

Embodiments of the invention can also include a screen washing system 160 to wash the screen to promote efficient drainage therethrough. A washing system shown in a representative location within the extractor is shown in FIGS. 2A and B. The washing system can include a plurality of individual washing system units arranged in series within the extractor. As shown, the screen washing system 160 can include a washing fluid (e.g., a mixture of an alcohol (e.g., ethanol) and water, or a hydrocarbon (e.g., hexane)) intake 170 connected to a supply (not shown) and a plurality of outlet nozzles 180 directed towards the screen. In some embodiments, the washing fluid intake is connected to the supply by a flexible conduit, such as a hose 170. The supply can be part of the fluid supply system 90. In certain embodiments, discharged washing fluid can be collected in the extractor's fluid removal system 100 and mixed with the extraction fluid applied to the solid materials and/or reused in subsequent washing steps.

The nozzles 180 may be arranged in any suitable configuration. In some embodiments, the screen washing system is disposed under the screen, and the outlet nozzles are directed upwards at a bottom surface of the screen. For example, when screen 140 is formed of parallel bars with adjacent gaps, nozzles 180 can be aligned underneath gap rows (e.g., positioned directly below the gaps) and configured to direct washing fluid up into the gaps. For instance, nozzles 180 can be arranged in rows parallel to rows of the bars forming screen 140 and gaps therebetween.

In certain embodiments, at least one of the plurality of nozzles is positioned such that a washing fluid spray fan 190 from the nozzle is aligned with a slot in the screen. In one example, the plurality of nozzles are placed about 10 and about 30 (e.g., about 20) inches from the bottom of the screen. In some embodiments, the nozzles provide a washing fluid spray angle of about 30 to about 65 degrees. The pressure of the washing fluid may vary and, in some examples, can range from 10 psi to 100 at the outlet of the nozzles.

Figure 3:
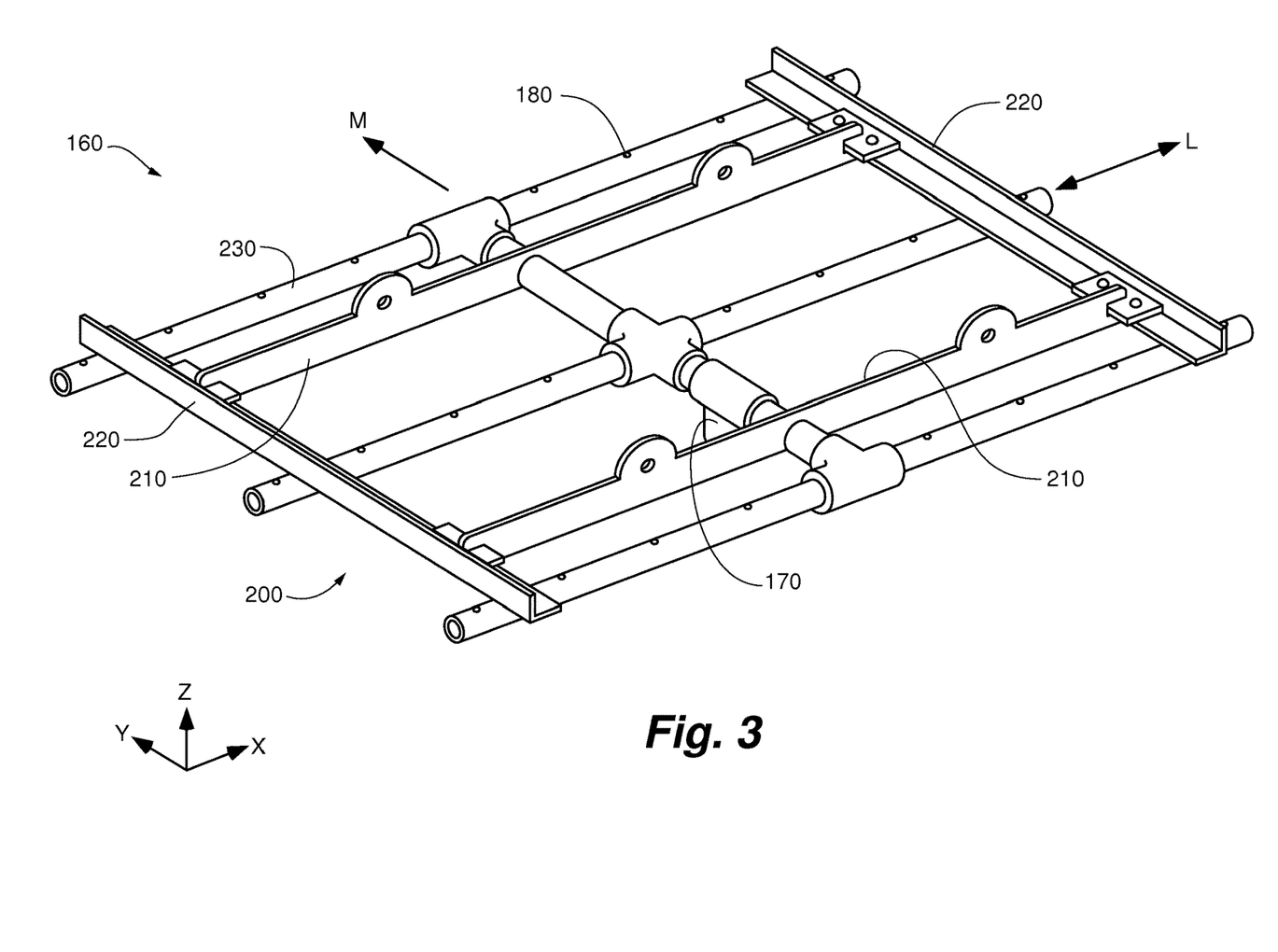
FIG. 3 is a perspective view of a washing system in accordance with an embodiment of the invention.

As shown in FIG. 3, the washing system 160 can include a frame 200 supported by the extractor. In general, the frame is positioned below the screen. In some embodiments, the washing system is held fixed with respect to a direction of solid material travel "M" within the extraction chamber. As shown, the frame 200 can include a washing frame beam 210 and a cross-member 220 supporting washing fluid delivery pipes 230 carrying the nozzles 180. In some embodiments, the washing system includes at least one (e.g., two or three) washing fluid pipes supported by the frame and in fluid communication with the washing fluid intake, and each of the pipes includes a plurality of outlet nozzles. In certain embodiments, the washing fluid delivery pipes 230 have longitudinal axes perpendicular to a direction of solid material travel "M" within the extraction chamber. Multiple frames or a single frame can be positioned within each individual extraction chamber depending on the desired application.

Figure 4:
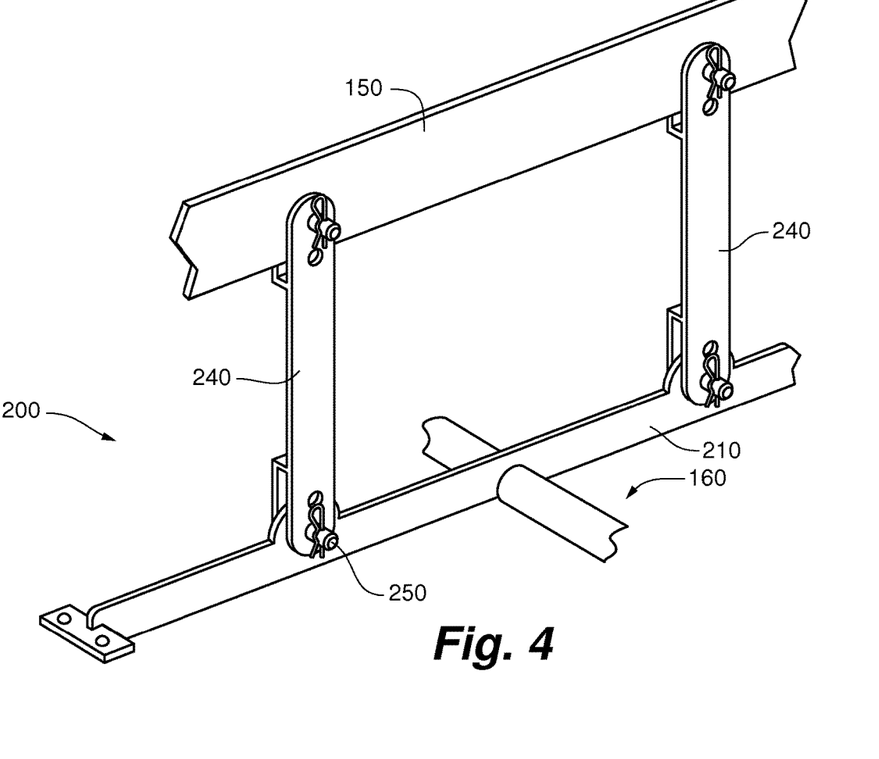
FIG. 4 is a perspective view of a portion of a washing system frame in accordance with an embodiment of the invention.
Figure 5A:
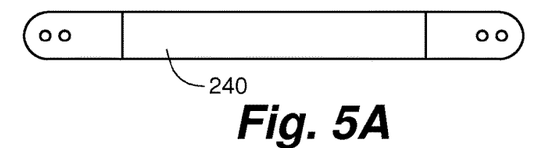
FIG. 5A is a side-elevation view of a link bar.
Figure 5B:
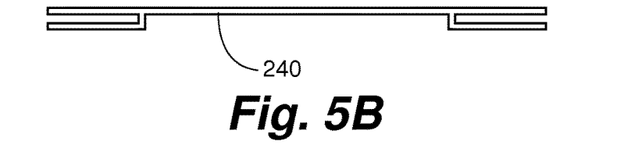
FIG. 5B is a view of the link bar shown in FIG. 5A turned 90 degrees.

In some embodiments, the frame 200 is supported from above (e.g., in the Z-direction indicated on FIG. 1 defined relative to gravity) by the screen frame 150. In other embodiments, the frame is supported from below by the extractor. In the embodiment shown in FIG. 4, the frame includes a link bar 240 having a first end connected to the screen frame 150 and a second end connected to a washing frame beam 210. In such an embodiment, the washing system is suspended below (e.g., from) the screen frame (e.g., in the negative Z-direction indicated on FIG. 1). An embodiment of the link bar 240 is also shown in FIGS. 5A and B. Because the nozzles can be provided on the washing pipes located between the screen frame members, embodiments of the invention are useful for focusing washing fluid spray from the nozzles onto the bottom of the screen where it is useful rather than into the screen frame members.

In some embodiments, the washing system 160 can move with respect to the screen to promote better washing of the screen. In certain embodiments, the washing system moves laterally with respect to the screen, in a direction "L" (e.g., in the X-direction indicated on FIGS. 1-3) that is perpendicular to the direction of material travel "M". In a specific embodiment, the washing system moves about 16 inches to about 20 inches (e.g., about 18 inches) laterally with respect to the screen. In some embodiments, the washing system is held fixed with respect to a direction of solid material travel "M" within the extraction chamber. In some embodiments, the washing fluid spray from the nozzles is focused onto the bottom of the screen rather than into the screen frame members throughout the range of motion of the system.

Figure 6:
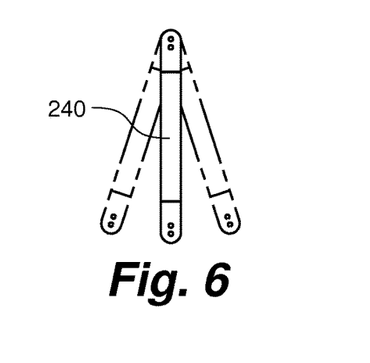
FIG. 6 shows representative pivoting movement of the link bar shown in FIG. 5A.
Figure 7:
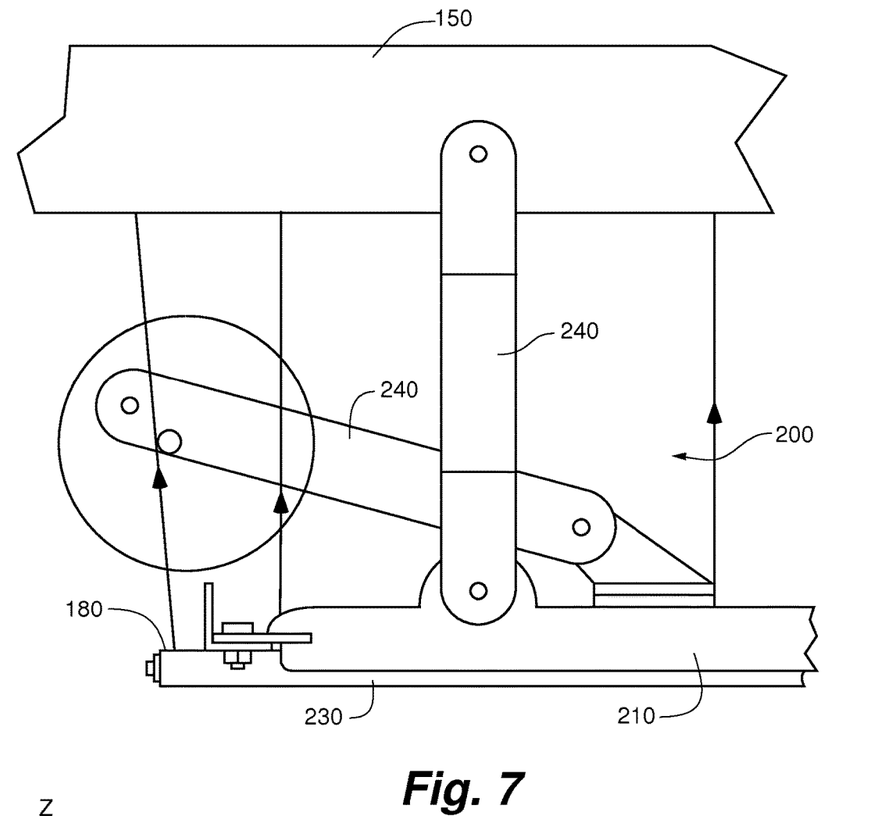
FIG. 7 shows representative pivoting of a washing system in accordance with an embodiment of the invention.

In certain embodiments, the frame 200 can be pivotably connected to a support member of the extractor to facilitate the lateral movement. In the embodiment shown in FIG. 4, the frame 200 is pivotably connected to the screen frame 150 via the link bar 240. In a specific embodiment, the first end of the link bar 240 is pivotably connected to the screen frame 150 and the second end of the link bar is pivotably connected to the washing frame beam 210. Each such connection can include a hinge pivotable about a hinge pin 250. Such pivoting connections allow the frame 200 to swing from the screen frame 150, thereby allowing the nozzles to move laterally with respect to the screen frame along an arcuate path. Representative pivoting movement of the link bar 240 is depicted in FIGS. 6 and 7.

In some embodiments, the washing system oscillates with respect to the screen. In certain embodiments, the washing system oscillates laterally with respect to the screen, in a direction "L" that is perpendicular to the direction of material travel. In a specific embodiment, the washing system oscillates about 16 inches to about 20 inches (e.g., about 18 inches) laterally with respect to the screen at a rate of about 48 inches per minute.

To help facilitate movement, extractor 10 and/or washing screen system 160 can utilize flexible hosing 172 and swivelable washing fluid connectors to deliver washing fluid from outside of extractor 10 to washing screen system 160 during operation (e.g., oscillating movement, lateral translation). For example, intake 170 on washing screen system 160 can be configured with one or more rotatable connectors (e.g., one rotatable connector to provide one axis rotation, two rotatable connectors to provide two axis rotation), allowing the end of hose 172 attached to intake 170 to rotate after being connected and/or while delivering washing fluid to washing screen system 160. In one such example, the swivel connector can provide a swivel axis perpendicular to the direction of material travel through the extractor.

The opposite end of hose 172 from washing screen system 160 can be attached to a washing fluid supply inlet (e.g., manifold) extending through extractor 10 (e.g., a stationary wall surface of the extractor). The connection attaching the end of the hose 172 to the washing fluid supply inlet at the stationary wall surface may or may not also be configured as a rotatable connector. When a rotatable or swivel connector is used, the connection can be formed of one or more rotatable connectors (e.g., one rotatable connector to provide one axis rotation, two rotatable connectors to provide two axis rotation), allowing the end of hose 172 attached to the inlet at the stationary wall surface to rotate after being connected and/or while delivering washing fluid through the connector.

Figure 8A:
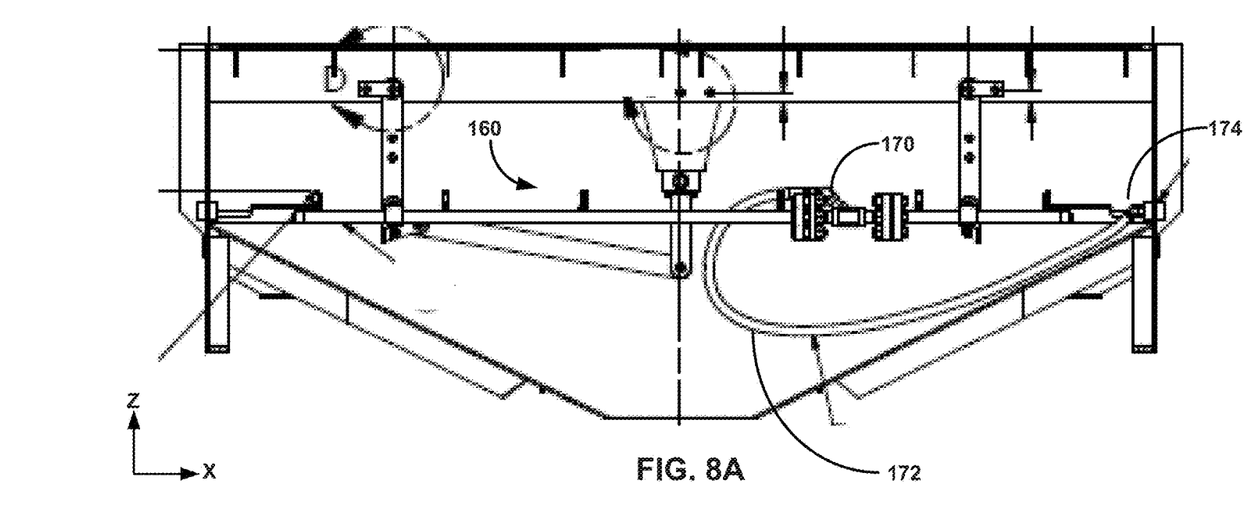
FIG. 8A is a side view illustration showing an example configuration of a fluid supply system for delivering washing fluid to a washing screen system.
Figure 8B:
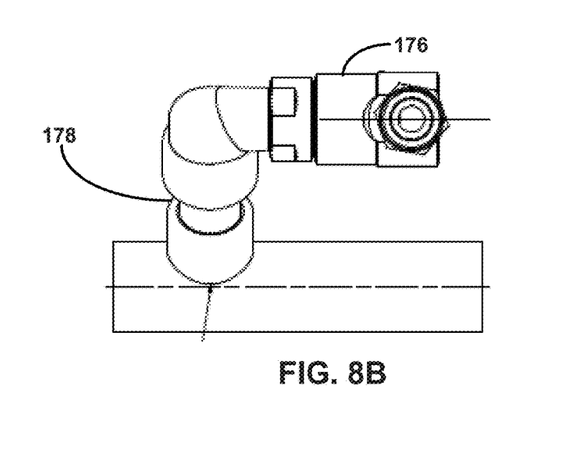
FIG. 8B is an illustration of an example connector that can be used on one or both sides of a conduit connecting a washing screen system to a washing fluid source inlet.

FIG. 8A is a side view illustration of extractor 10 showing an example configuration of the fluid supply system delivering washing fluid to washing screen system 160. In this example, hose 172 delivers washing fluid through a washing fluid supply inlet 174 extending through a wall surface of extractor 10 to intake 170. Intake 170 is configured with one or more swivel connectors and, in the illustrated example, provides an axis of swivel parallel to the direction of material travel through the extractor. The washing fluid supply inlet 174 can also be configured with one or more swivel connectors. The length of hose 172 may be effective (e.g., contains sufficient slack) to allow washing fluid supply system 160 to move (e.g., translate and/or oscillate) without inhibiting movement. In some examples, hose 172 has excess length forming a curved profile inside of extractor 10, with a portion of the hose resting on a lower wall surface of extractor 10 for support, as illustrated in FIG. 8A. FIG. 8B shows an example swivel connector configuration for hose 172 where the connector includes a first swivel connection 176 providing a first axis of rotation and a second swivel connection 178 providing a second axis of rotation. Other connector arrangements are possible, however, and the disclosure is not limited in this respect.

Figure 9:
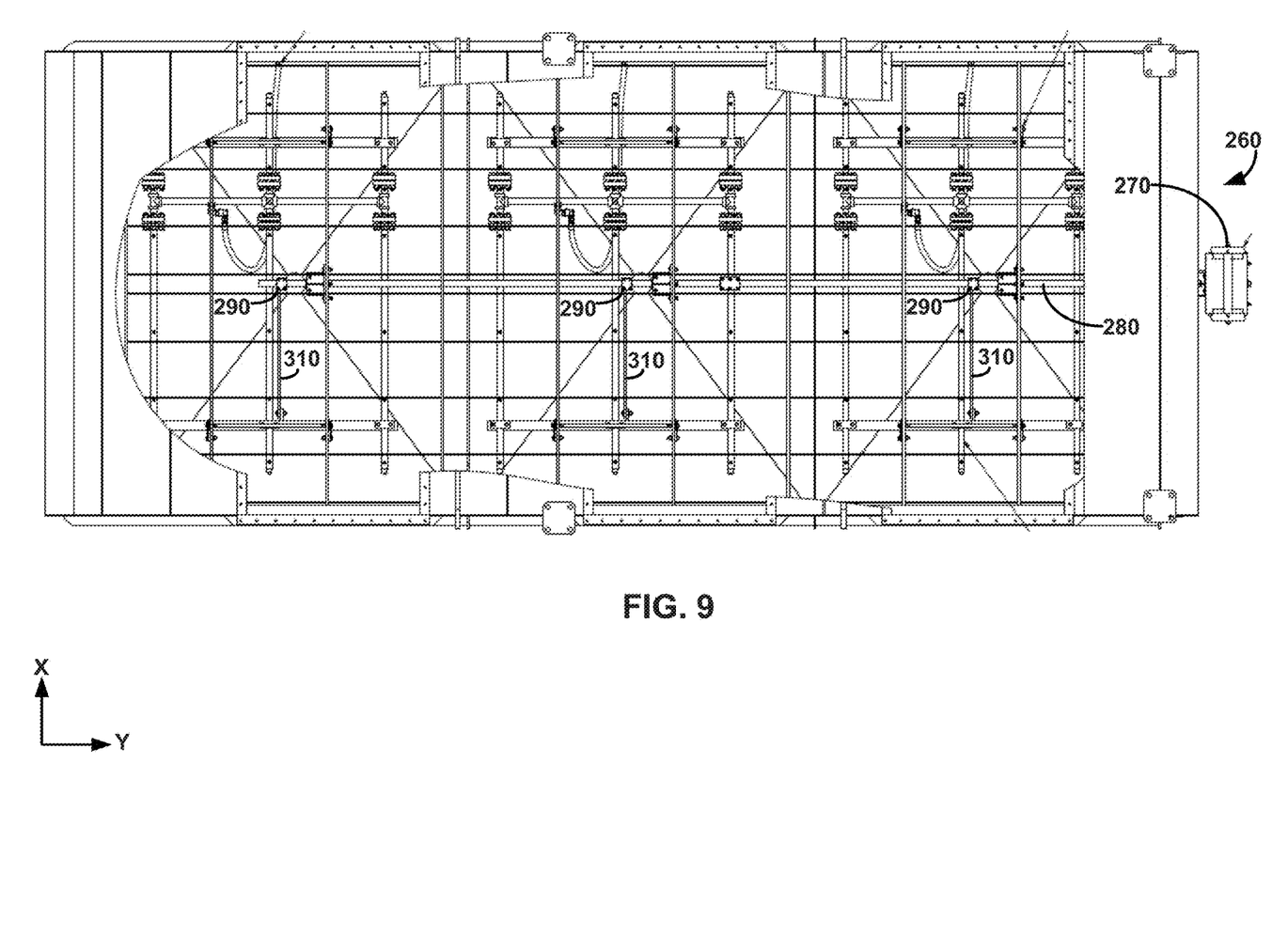
FIG. 9 is a top view illustration of a portion of an example extractor showing an example drive system for translating a washing system.

FIG. 9 is a top view illustration of a portion of extractor 10 showing an example drive system for translating washing system 160. As shown, some embodiments include a drive mechanism 260 to drive the oscillation of the washing system 160. The drive mechanism can include a motor 270 to rotationally drive a drive shaft 280. One or more rotors 290 can be coupled to the drive shaft and a connector 300 may be pivotably coupled to the rotor and the washing system frame. In the embodiment shown, the drive shaft is oriented parallel to the direction of material travel "M" and the connector is oriented perpendicular to the direction of material travel. In such embodiments, rotational movement of the drive shaft causes the washing system frame to swing laterally relative to the screen. The motor and drive shaft may drive movement of a single frame or multiple frames (e.g., four). As shown, when driving more than one washing system frames a coupling bar 310 may be provided to couple adjacent frames and the connector 300 may be coupled to the coupling bar. In certain embodiments, the motor is configured to drive the drive shaft at about one-half to about one rotation per minute.

During operation, the conveyor system moves a bed of material across the top of the screen from the inlet end of the upper extraction section clockwise through the passageway to the discharge opening. As the bed of material moves away from the inlet conduit and towards the discharge opening, it is repeatedly contacted with extraction fluid which filters downwardly therethrough and flows through the screen. A washing system as described herein is periodically activated to wash the screen to maintain the gaps or opening of the screen to promote efficient drainage therethrough.

In some embodiments, a control system is provided to periodically activate the washing system. The control system can include an input device, memory, and a processor in signal communication with one or more flow control valves operably connected to the fluid supply system, the washing fluid intake, and/or the fluid removal system. In certain embodiments, the control system is configured to periodically activate a subset of the washing system units within the washing system, such as in a sequential manner, by opening and/or closing one or more of the flow control valves. In one embodiment, the control system includes one or more sensors located in the fluid recovery system that determines a fluid level, and the control system activates the washing system unit based on the fluid level reading from the sensor. In embodiments of washing systems having lateral or oscillatory movement, the control system can also be in signal communication with a motor of a drive mechanism.

In one example, the control system activates the washing system to spray the underside of screen 150 and apertures therein while material is being moved through the extractor (e.g., dragged along the top surface of screen 150) and extraction fluid is being dispensed on the material via the fluid distribution system. In another example, the control system activates the washing system to spray the underside of screen 150 and apertures therein when solid material is not present for processing in the extractor. In these configurations, delivery of incoming solid material through inlet 60 (FIG. 1) is terminated and material present in extractor 10 is processed and discharged through outlet 70. After clearing the extractor of material, the control system activates the washing system to spray the underside of screen 150. Because the washing system is internal to the extractor, screen washing can be performed without opening up the extractor and consuming large amounts of processing downtime. In either application, the control system can control the washing system to simultaneously move (e.g., translate laterally, rock back and forth) while delivering washing fluid via one or more nozzles contained on the washing system.

Various examples have been described. These and other examples are within the scope of the following claims.

The invention claimed is:

1. An extractor system comprising:
an extraction chamber;
a conveyance system to convey solid materials through the extraction chamber in a direction of material travel;
a screen supported by a screen frame, the screen having a top surface across which the solid materials are conveyed by the conveyance system;
a fluid supply system disposed above the solid materials and configured to apply an extraction fluid to the solid materials to extract soluble components into the extraction fluid;
a fluid removal system disposed below the solid materials and configured for removing the extraction fluid after it has passed through the solid materials and the screen; and
a screen washing system disposed under the screen and supported against movement in the direction of material travel, the screen washing system including a washing fluid intake and a plurality of outlet nozzles spaced from and directed upward towards the screen and configured to apply a washing fluid to an underside of the screen
wherein the screen washing system is pivotably connected under the screen and configured to oscillate relative to the screen.

2. The extractor system of claim 1, wherein the extraction fluid applied to the solid materials includes a mixture of an alcohol and water, or a hydrocarbon.

3. The extractor system of claim 2, wherein the washing fluid is the same fluid as the extraction fluid applied to the solid materials.

4. The extractor system of claim 1, wherein the screen washing system includes at least one washing fluid delivery pipe having a longitudinal axis perpendicular to the direction of material travel within the extraction chamber.

5. The extractor system of claim 1, wherein at least one of the plurality of outlet nozzles is positioned such that a washing fluid spray fan from the outlet nozzle is aligned with a slot in the screen.

6. The extractor system of claim 1, wherein at least one of the plurality of outlet nozzles has a washing fluid spray fan of about 30 to about 65 degrees.

7. The extractor system of claim 1, wherein the plurality of outlet nozzles are placed about 10 inches to about 30 inches from the bottom of the screen.

8. The extractor system of claim 1, wherein the screen washing system is configured to oscillate in a direction perpendicular to the direction of material travel within the extraction chamber.

9. The extractor system of claim 8, wherein the screen washing system is configured to oscillate a distance of about 18 inches.

10. The extractor system of claim 8, wherein the screen washing system is configured to move at a rate of about 48 inches per minute.

11. The extractor system of claim 1, further including a drive mechanism to drive the oscillation of the screen washing system.

12. The extractor system of claim 11, wherein the drive mechanism includes a drive shaft, rotor, and connector to connect the drive shaft to a frame of the screen washing system.

13. The extractor system of claim 1, wherein the screen washing system is suspended from the screen frame.

14. The extractor system of claim 1, wherein the screen washing system includes a link bar having a first end pivotably connected to the screen frame and a second end pivotably connected to a washing frame beam, the washing frame beam being connected to a cross-member, and a washing fluid delivery pipe connected to the cross-member.

15. The extractor system of claim 1, wherein the screen frame supports the screen from the underside of the screen.

16. The extractor system of claim 1, wherein the screen includes a plurality of longitudinal members having a longitudinal axis aligned with the direction of material travel, further including a gap between adjacent longitudinal members.

17. The extractor system of claim 1, wherein the screen includes a plurality of longitudinal members and a plurality of stiffener members attached underneath the plurality of longitudinal members, the plurality of longitudinal members having a longitudinal axis aligned with the direction of material travel, and the plurality of stiffener members having a longitudinal axis aligned perpendicular with the direction of material travel.

18. The extractor system of claim 1, further including a screen washing system control system with an input device, memory, and a processor in signal communication with one or more flow control valves, the one or more flow control valves being operably connected to at least one of the fluid supply system, the washing fluid intake, and the fluid removal system.

19. The extractor system of claim 1, wherein the washing fluid intake of the screen washing system comprises a connector configured to rotate after attaching a washing fluid supply hose to the intake using the connector.

20. The extractor system of claim 1, further comprising a washing fluid supply inlet extending through a stationary wall surface of the extractor, wherein the washing fluid supply inlet also comprises a connector configured to rotate after attaching the washing fluid supply hose to the washing fluid supply inlet using the connector.

21. The extractor system of claim 1, wherein the screen washing system is configured to oscillate upward relative to one lateral side of the screen and oscillate upward relative to an opposite lateral side of the screen, causing the plurality of outlet nozzles to move laterally with respect to the screen along an arcuate path.

* * * * *